United States Patent
Jiang et al.

(10) Patent No.: US 10,726,565 B2
(45) Date of Patent: *Jul. 28, 2020

(54) SYSTEMS AND METHODS FOR IMAGE PROCESSING IN MAGNETIC RESONANCE IMAGING

(71) Applicant: SHANGHAI UNITED IMAGING HEALTHCARE CO., LTD., Shanghai (CN)

(72) Inventors: Luan Jiang, Shanghai (CN); Qiang Li, Shanghai (CN); Shan Ling, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,846

(22) Filed: Jun. 17, 2019

(65) Prior Publication Data

US 2019/0333236 A1    Oct. 31, 2019

Related U.S. Application Data

(63) Continuation of application No. 15/353,916, filed on Nov. 17, 2016, now Pat. No. 10,346,993.

(30) Foreign Application Priority Data

Nov. 17, 2015 (CN) .......................... 2015 1 0788341
Nov. 17, 2015 (CN) .......................... 2015 1 0788374

(51) Int. Cl.
G06T 7/33    (2017.01)
G06T 7/00    (2017.01)

(52) U.S. Cl.
CPC .............. *G06T 7/33* (2017.01); *G06T 7/0016* (2013.01); *G06T 2207/10088* (2013.01); *G06T 2207/30048* (2013.01)

(58) Field of Classification Search
CPC ..................... G06T 7/0016; G06T 7/33; G06T 2207/10088; G06T 2207/30048
See application file for complete search history.

(56) References Cited

U.S. PATENT DOCUMENTS 7,127,093 B2 * 10/2006 Bansal .................... G06T 7/337
  382/128
7,155,042 B1 * 12/2006 Cowan ................... A61B 5/055
  382/128

(Continued)

FOREIGN PATENT DOCUMENTS

CN   102722882 A   10/2012
CN   103400398 A   11/2013

(Continued)

OTHER PUBLICATIONS

First Office Action in Chinese Application No. 201510788341.4 dated Nov. 8, 2019, 22 pages.

(Continued)

*Primary Examiner* — Mekonen T Bekele

(57) ABSTRACT

A method and system for image processing are provided. An MR image including a plurality of slice images may be obtained. The plurality of slice images including a myocardium of a left ventricle. A reference image for each slice image of the plurality of slice images may be determined. An endocardial boundary of the myocardium for the each slice image of the plurality of slice images may be determined. The each slice image of the plurality of slice images may be registered according to a corresponding reference image. An epicardial boundary of the myocardium in the each slice image of the plurality of slice images may be determined (Continued)

according to the endocardial boundary of the myocardium in the registered each slice image of the plurality of slice images.

20 Claims, 14 Drawing Sheets

(56) References Cited

U.S. PATENT DOCUMENTS

| | | | |
|---|---|---|---|
| 7,587,232 B2* | 9/2009 | Sugiura | A61B 5/055 |
| | | | 324/307 |
| 7,907,759 B2* | 3/2011 | Hundley | A61B 5/055 |
| | | | 382/128 |
| 8,369,590 B2 | 2/2013 | Wang et al. | |
| 9,275,266 B2* | 3/2016 | Wang | A61B 6/503 |
| 10,290,109 B2* | 5/2019 | Jiang | G06T 7/12 |
| 2004/0052409 A1* | 3/2004 | Bansal | G06T 7/337 |
| | | | 382/128 |
| 2006/0100518 A1 | 5/2006 | Krishinan | |
| 2007/0253609 A1* | 11/2007 | Aben | G06T 7/11 |
| | | | 382/128 |
| 2008/0230703 A1 | 9/2008 | Kadrmas et al. | |
| 2008/0260230 A1 | 10/2008 | Gotardo et al. | |
| 2009/0103791 A1 | 4/2009 | Suri et al. | |
| 2009/0232371 A1* | 9/2009 | Jolly | G06K 9/342 |
| | | | 382/128 |
| 2012/0263368 A1* | 10/2012 | Nakano | A61B 6/032 |
| | | | 382/133 |
| 2013/0182935 A1* | 7/2013 | Wang | G06K 9/3233 |
| | | | 382/133 |
| 2016/0098833 A1 | 4/2016 | Tsadok et al. | |
| 2017/0178285 A1* | 6/2017 | Jiang | G06T 7/12 |

FOREIGN PATENT DOCUMENTS

| | | |
|---|---|---|
| CN | 103927733 A | 7/2014 |
| CN | 104978730 A | 10/2015 |

OTHER PUBLICATIONS

First Office Action in Chinese Application No. 201510788374.9 dated Nov. 28, 2019, 18 pages.

Zhang, kaizi et al., examination of nuclear medicine, clinical heart failure, 2014, pp. 476-486.

* cited by examiner

1210

SYSTEMS AND METHODS FOR IMAGE PROCESSING IN MAGNETIC RESONANCE IMAGING

CROSS-REFERENCE TO RELATED APPLICATIONS

This application is a continuation of U.S. patent application Ser. No. 15/353,916, filed on Nov. 17, 2016, which is claims priority of Chinese Patent Application No. 201510788341.4 filed on Nov. 17, 2015, Chinese Patent Application No. 201510788374.9 filed on Nov. 17, 2015, the contents of each of which are hereby incorporated by reference.

TECHNICAL FIELD

The present disclosure generally relates to magnetic resonance imaging (MRI), and more particularly, to heart perfusion MRI.

BACKGROUND

Heart perfusion magnetic resonance imaging techniques are widely used in heart disease diagnosis. However, MR images may include distortion and/or artifacts, which may cause misdiagnose. Thus, it may be desirable to develop systems and methods that process and correct MR images, thereby improving the quality of MR images.

SUMMARY

The present disclosure relates to MRI. One aspect of the present disclosure relates to a method for image processing. The method may include one or more of the following operations. An MR image including a plurality of slice images may be obtained. The plurality of slice images including a myocardium of a left ventricle, (or referred herein as myocardium). A reference image for each slice image of the plurality of slice images may be determined. An endocardial boundary of the myocardium for the each slice image of the plurality of slice images may be determined. The each slice image of the plurality of slice images may be registered according to a corresponding reference image. An epicardial boundary of the myocardium in the each slice image of the plurality of slice images may be determined according to the endocardial boundary of the myocardium in the registered each slice image of the plurality of slice images.

In some embodiments, the determining the reference image for the each slice image of the plurality of slice images and the determining the endocardial boundary of the myocardium for the each slice image of the plurality of slice images may include one or more of the following operations. The endocardial boundary of the myocardium in a starting slice image may be determined. The reference image in the starting slice image may be determined. The endocardial boundary of the myocardium in a non-starting slice image may be determined. The reference image in the non-starting slice image may be determined.

In some embodiments, the determining the endocardial boundary of the myocardium in the starting slice image and the determining the reference image in the starting slice image may include one or more of the following operations. One or more candidate images in the starting slice image may be obtained. An initial region of interest in the one or more candidate images may be determined. A blood pool area in the one or more candidate images may be determined according to the initial region of interest in the one or more candidate images. A blood pool area in the starting slice image and the reference image in the starting slice image may be determined according to the blood pool areas in the one or more candidate images. A region of interest in the starting slice image may be determined according to the blood pool area in the starting slice image.

In some embodiments, the determining the endocardial boundary of the myocardium in the non-starting slice image and the determining the reference image in the non-starting slice image may include one or more of the following operations. One or more candidate images in the non-starting slice image may be obtained. An initial region of interest in the one or more candidate images may be determined according to the reference image of the previous slice of the non-starting slice image. A blood pool area in the one or more candidate images may be determined according to the initial region of interest in the one or more candidate images and the reference image of the previous slice of the non-starting slice image. A blood pool area in the non-starting slice image and the reference image in the non-starting slice image may be determined according to the blood pool area in the one or more candidate images. A region of interest in the non-starting slice image may be determined according to the blood pool area in the non-starting slice image.

In some embodiments, the registering each slice image of the plurality of slice images according to a corresponding reference image may include one or more of the following operations. A rigid registration on the each slice image of the plurality of slice images may be performed according to a corresponding reference image. A determination whether a non-rigid registration of the each slice image of the plurality of slice images after rigid registration is needed may be made. A non-rigid registration on the each slice image of the plurality of slice images after the rigid registration may be performed if a non-rigid registration of the each slice image of the plurality of slice images after rigid registration is needed.

In some embodiments, the rigid registration on the each slice image of the plurality of slice images may further include a first step of image registration and a second step of image registration.

In some embodiments, the each slice image of the plurality of slice images may include a plurality of images obtained in a plurality of cardiac cycles. The rigid registration of the each slice image of the plurality of slice images may be performed from the reference image of the each slice image of the plurality of slice images to an image obtained in an earlier cardiac cycle than the reference image and to an image obtained in a later cardiac cycle than the reference image. The rigid registration of the each slice image of the plurality of slice images may include one or more of the following operations. The each slice image of the plurality of slice images may be deformed. A first similarity between the deformed each slice image of the plurality of slice images and the reference image of the each slice image of the plurality of slice images may be determined. A second similarity between the deformed each slice image and a registered image of a previous slice image or between the deformed each slice image and a registered image of a next slice image may be determined. A determination whether a sum of the first similarity and the second similarity is largest may be made.

In some embodiments, the determining the epicardial boundary of the myocardium in the each slice image of the plurality of slice images according to the endocardial boundary of the myocardium in the registered each slice image of the plurality of slice images may include one or more of the following operations. A maximum intensity projection image and a reference image of the each slice image of the plurality of slice images may be obtained. The maximum intensity projection image and the reference image of the each slice image of the plurality of slice images may be transferred to a maximum intensity projection image and a reference image in polar coordinates of the each slice image of the plurality of slice images according to the endocardial boundary of the myocardium in the registered each slice image of the plurality of slice images. A right ventricle area and a constrained area in the reference image in the polar coordinates of the each slice image of the plurality of slice images may be determined. The epicardial boundary of the myocardium in the maximum intensity projection image in the polar coordinates of the each slice image of the plurality of slice images may be determined according to the right ventricle area and the constrained area in the reference image in the polar coordinates of the each slice image of the plurality of slice images.

In some embodiments, the determining the right ventricle area and the constrained area in the reference image in the polar coordinates of the each slice image of the plurality of slice images may include one or more of the following operations. The reference image in the polar coordinates of the each slice image of the plurality of slice images may be clustered. The right ventricle area in the reference image in the polar coordinates in a starting slice image may be determined. The right ventricle area in the reference image in the polar coordinates in a non-starting slice image may be determined. The constrained area may be determined according to the right ventricle area and the endocardial boundary of the myocardium in the reference image in the polar coordinates of the each slice image of the plurality of slice images.

In some embodiments, the method for image processing may further comprise partitioning the myocardium of the left ventricle in the each slice image of the plurality of slice images.

In some embodiments, the partitioning the myocardium of the left ventricle in the each slice image of the plurality of slice images may be according to a Bull's eye method.

A further aspect of the present disclosure relates to a system for image processing. The system may include a memory device and one or more processors. The memory device may be configured to store instructions. The one or more processors may be configured to execute the instructions. The instructions may include one or more of the following operations. An MR image including a plurality of slice images may be obtained. The plurality of slice images including a myocardium of a left ventricle. A reference image for each slice image of the plurality of slice images may be determined. An endocardial boundary of the myocardium for the each slice image of the plurality of slice images may be determined. The each slice image of the plurality of slice images may be registered according to a corresponding reference image. An epicardial boundary of the myocardium in the each slice image of the plurality of slice images may be determined according to the endocardial boundary of the myocardium in the registered each slice image of the plurality of slice images.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
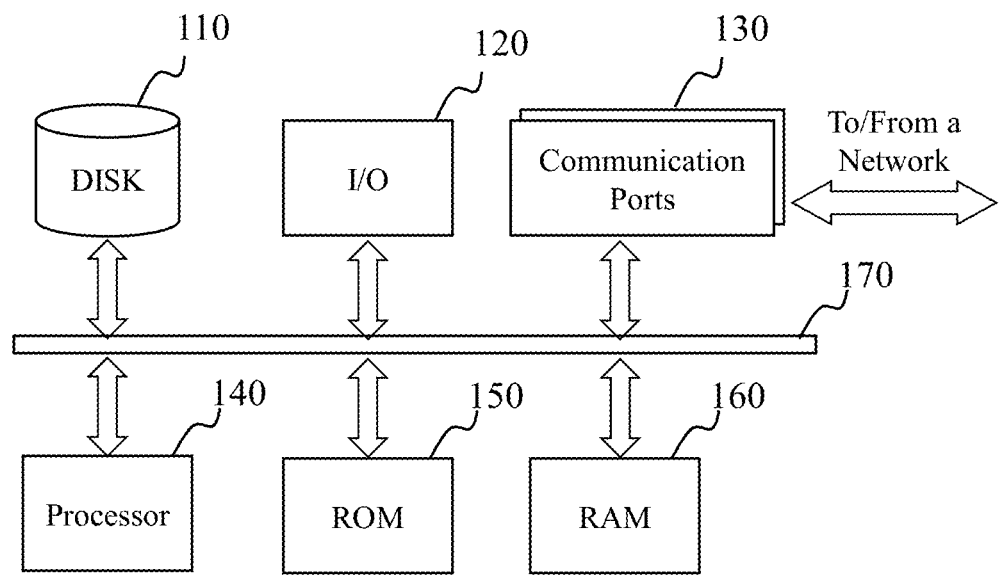
FIG. 1 illustrates an architecture of an exemplary computing device in accordance with some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

It will be understood that when a unit, engine, module or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The present disclosure relates to systems and methods for image processing in heart perfusion MRI. According to some embodiments of the present disclosure, the method may include obtaining an MR image including a plurality of slice images. The plurality of slice images may include a myocardium of a left ventricle. The plurality of slice images may obtained from a substantially same section (portion) of myocardium of a left ventricle during a number of cardiac cycles. The method may also include determining a reference image for each slice image of the plurality of slice images. The method may further include determining an endocardial boundary of the myocardium for each slice image of the plurality of slice images. The method may further include registering each slice image of the plurality of slice images according to a corresponding reference image The method may further include determining an epicardial boundary of myocardium in the each slice image of the plurality of slice images according to the endocardial boundary of myocardium in the registered each slice image of the plurality of slice images.

FIG. 1 illustrates an exemplary architecture of a computing device 100 for image processing. Computing device 100 may be a general purpose computer or a special purpose computer, configured to perform the functions disclosed in this application. For example, image segmentation and image registration may be implemented on computing device 100, via its hardware, software program, firmware, or a combination thereof. Although only one such computer is shown, for convenience, the computer functions relating to image processing as described herein may be implemented in a distributed fashion on a number of similar platforms, to distribute the processing load.

Computing device 100, for example, may include a communication port 130 configured to facilitate communications between computing device 100 and other devices via, for example, a network (wired or wireless). Computing device 100 may also include a processor 140 configured to execute program instructions stored in a storage device (e.g., disk 110, ROM 150, and RAM 160) or a non-transitory computer-readable medium. When processor 140 executes the program instructions, computing device may be caused to perform one or more functions disclosed in this application. For example, processor 140 may performing one or more operations on MR images. The operations may include image manipulation (e.g., rotating, flipping, resizing, or cropping), image segmentation, image correction, image registration, image matching, image partition, image smoothing, or the like, or a combination thereof.

Processor 140 may include or is part of one or more known processing devices such as a microprocessor. In some embodiments, processor 140 may include any type of single or multi-core processor, mobile device microcontroller, central processing unit, etc.

Computing device 100 may further include an internal communication bus 170, program storage, and data storage of different forms, such as, disk 110, read only memory (ROM) 150, or random access memory (RAM) 160, for various data files to be processed and/or communicated by the computer, as well as possibly program instructions to be executed by processor 140. Computing device 100 may also include an I/O component 120, supporting input/output flows between the computing device 100 and other components therein such as user interface elements (not shown in figures). Computing device 100 may also receive programming and data via network communications.

Hence, aspects of the methods of the image processing and/or other processes, as described herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a scheduling system into the hardware platform(s) of a computing environment or other system implementing a computing environment or similar functionalities in connection with image processing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s), or the like, which may be used to implement the system or any of its components shown in the drawings. Volatile storage media may include dynamic memory, such as a main memory of such a computer platform. Tangible transmission media may include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media may include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described herein may be embodied in a hardware device, it may also be implemented as a software only solution—e.g., an installation on an existing server. In addition, image processing as disclosed herein may be implemented as a firmware, firmware/software combination, firmware/hardware combination, or a hardware/firmware/software combination.

Figure 2:
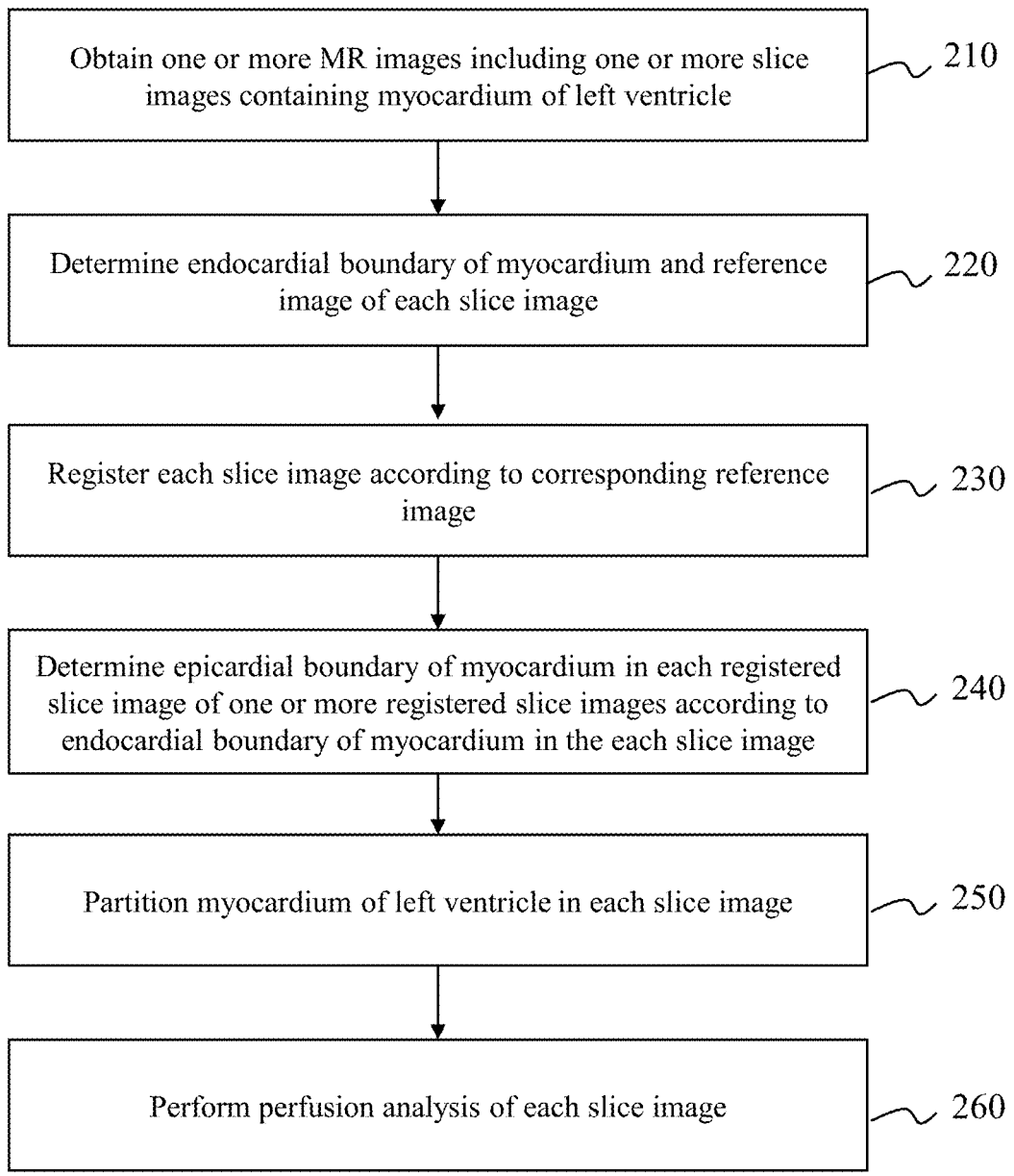
FIG. 2 illustrates a flowchart illustrating an exemplary process for image processing in accordance with some embodiments of the present disclosure.

FIG. 2 illustrates a flowchart illustrating an exemplary process 200 for image processing in accordance with some embodiments of the present disclosure. In some embodiments, at least part of process 200 may be performed by processor 140.

Figure 9:
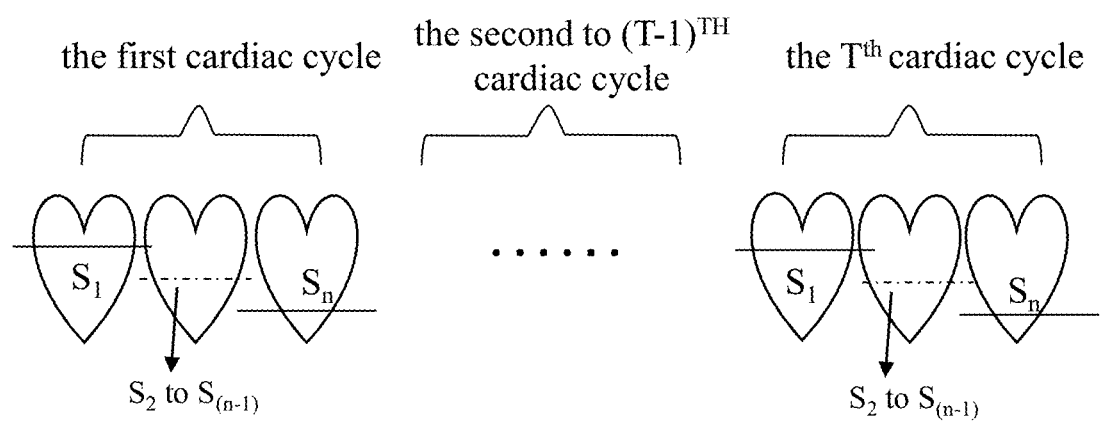
FIG. 9 illustrates an exemplary MR image in accordance with some embodiments of the present disclosure.

In 210, one or more MR images including one or more slice images may be obtained. The one or more slice images may contain a myocardium of a left ventricle. In some embodiments, the one or more MR images may be obtained by an MRI device. Alternatively or additionally, the one or more MR images may be obtained by processor 140. Each slice image of the one or more slice images may include one or more MR images obtained in one or more cardiac cycles. The MR images may be denoted as $I_{NT}$, wherein N represents the number of slice images and T represents the number of cardiac cycles. N and T may be any integers that are equal to or greater than 1. Merely by way of example, the MR images may include N slice images obtained in T cardiac cycles, as shown in FIG. 9.

The object to be scanned (e.g., a human being) may be injected with a tracer or a contrast agent before being scanned. The MRI device may generate one or more slice images of different parts of a heart before, during and/or after the tracer or the contrast agent flow into the heart. The each slice may include one or more MR images be obtained in successive T cardiac cycles or T cardiac phases. Suppose that the cardiac cycle is $\Delta t$ in length, it may take $\Delta t*T$ to finishing scanning. In each cardiac cycle, N slice image(s) may be obtained. In that case, N*T MR image(s) may be obtained in total.

In some embodiments, six slice images along the long axis of heart may be obtained; that is, N is equal to six. T may be any integer greater than 40 and less than 60. It is understood that the number of N and/or T disclosed herein are provided for illustration purposes, and not intended to limit the scope of the present teachings. N may be any positive integer (e.g., 4, 8, or 10). T may be any positive integer (e.g., 10, 40, or 60).

In 220, an endocardial boundary of myocardium and a reference image of each slice image may be determined. In some embodiments, the determinations may be performed by processor 140. In some embodiments, the endocardial boundary of myocardium in a starting slice image and the reference image in the starting slice image may be determined first. The endocardial boundary of myocardium in a non-starting slice image and the reference image in the non-starting slice image may then be determined. More descriptions regarding the determinations of endocardial boundary of myocardium and reference image may be found elsewhere in the present disclosure (e.g., FIGS. 3-5 and the relevant descriptions).

In 230, each slice image may be registered according to a corresponding reference image. In some embodiments, the registration of each slice image may be performed by processor 140. Image registration is a process of matching an image to be registered with a template image so that the difference between the two images may be reduced as far as possible. The image to be registered and the template image may be two images that are obtained in different conditions (e.g., different sensors, different times, or different viewpoints). The registration of a slice may include a rigid registration and a non-rigid registration. More descriptions regarding the registration of a slice image may be found elsewhere in the present disclosure (e.g., FIG. 6 and the relevant descriptions).

In 240, an epicardial boundary of myocardium of each slice image of may be determined according to the endocardial boundary of myocardium in the registered each slice image. In some embodiments, the determination of the epicardial boundary of myocardium may be performed by processor 140. More descriptions regarding the determination of epicardial boundary of myocardium may be found elsewhere in the present disclosure (e.g., FIGS. 7-8, and the relevant descriptions).

In 250, a myocardium in each slice image may be partitioned. In some embodiments, the partition of the myocardium may be performed by processor 140. The partition of myocardium may be performed according to the connection line with the centroid of blood pool area and the center point of the boundary of the right ventricle area adjacent to the left ventricle. The partition of myocardium may be performed according to a Bull's eye method. The myocardium may be partitioned into one or more segments according to the Bull's eye method. The number of partitioned segments may be any positive integer (e.g., three, ten, or seventeen).

Figure 13:
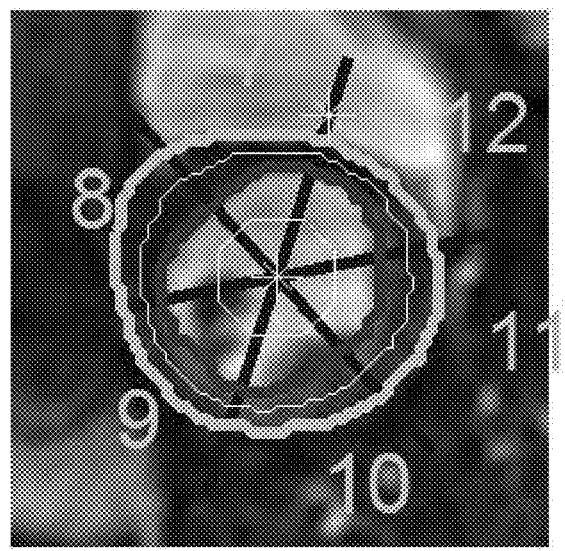
FIG. 13 illustrates an exemplary partitioned myocardium in accordance with some embodiments of the present disclosure.

Merely by way of example, the heart may be partitioned into three parts including, for example, an apical slice, a midventricular slice, and a basal slice. The apical slice of the myocardium may be further partitioned into four segments. The midventricular slice and the basal slice of the myocardium may be further partitioned into six segments. As another example, as shown in FIG. 13, the largest roughly circular curve depicts the epicardial boundary of myocardium. The dark roughly circular curve depicts the endocardial boundary of myocardium. The area between the largest roughly circular curve and the dark roughly circular curve is the myocardium of the left ventricle. The internal region within the myocardium is the blood pool of the left ventricle. The white roughly circular curve on the myocardium partitions the myocardium into two ring shape segments. The black straight lines partitions the myocardium into six segments.

In 260, a perfusion analysis of each slice image may be performed. In some embodiments, the perfusion analysis of the slice image may be performed by processor 140. A time-intensity curve of blood pool area and/or myocardium in each slice image may be determined and smoothed. The time may be the cardiac cycle. The intensity may be the average grey value of pixels in the area. According to the time-intensity curve of blood pool area and myocardium, the cardiac cycle may be determined when contrast agent flows into the left ventricle, and the cardiac cycle may be determined when contrast agent flows out the left ventricle. Merely by way of example, the cardiac cycle (when contrast agent flows into the left ventricle) may be the first turning point that the time-intensity curve begins to rise. The cardiac cycle (when contrast agent flows out the left ventricle) may be the cardiac cycle of the peak point of time-intensity curve plus 10 cardiac cycles.

In some embodiments, the myocardium in each slice image may be partitioned into a plurality of segments, and perfusion analysis of the plurality of segments may be performed. A time-intensity curve of each segments of the myocardium in each slice image may be determined and smoothed. According to the time-intensity curve of the plurality of segments of the myocardium, one or more parameters related to the time-intensity curve of the plurality of segments of the myocardium may be determined. The one or more parameters related to the time-intensity curve of the plurality of segments of the myocardium may include the peak intensity, the time to peak, the maximum upslope of the time-intensity curve, the like, or a combination thereof. The one or more parameters related to the time-intensity curve may be used in a Bull's eye image.

In some embodiments, a time-intensity curve for the myocardium of each slice image may be determined. The time-intensity curve for myocardium of each slice image may be smoothed and/or corrected based on the baseline. According to the time-intensity curve for the myocardium, one or more parameters related to the time-intensity curve of pixel in the myocardium may be determined. The one or more parameters related to the time-intensity curve for the myocardium may include the peak intensity, the time to peak, the maximum upslope of the time-intensity curve, the like, or a combination thereof. The one or more parameters related to time-intensity curve may be determined.

It should be noted that process 200 described above is provided for the purposes of illustration, and not intended to limit the scope of the present disclosure. Apparently for persons having ordinary skills in the art, numerous variations and modifications may be conducted under the teaching of the present disclosure. However, those variations and modifications do not depart the protection scope of the present disclosure. In some embodiments, some operations may be optional. For example, step 250 and/or step 260 may be omitted. In some embodiments, the order of some operations may be changed. For example, step 260 may be performed before step 250. Similar modifications should fall within the scope of the present disclosure.

Figure 3:
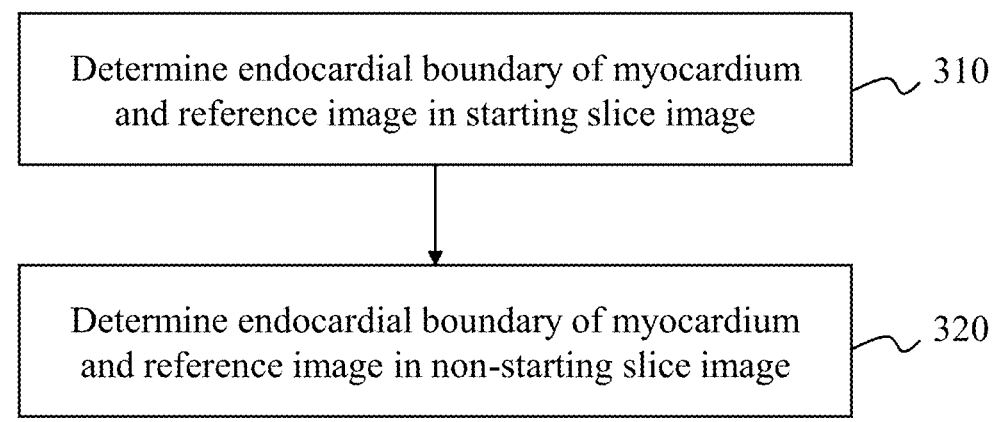
FIG. 3 illustrates a flowchart illustrating an exemplary process for determining the endocardial boundary of myocardium in accordance with some embodiments of the present disclosure.

In some embodiments, step 220 of process 200 may be performed according to an exemplary process 300 illustrated in FIG. 3 for determining the endocardial boundary of myocardium in accordance with some embodiments of the present disclosure.

In 310, an endocardial boundary of myocardium and a reference image in the starting slice image may be determined. In some embodiments, the determinations of the endocardial boundary of myocardium and the reference image may be performed by processor 140. The starting slice image may be denoted as $I_{1T}$, wherein T represents the number of cardiac cycle. In some embodiments, the starting slice image may be a slice below the midventricular slice of the left ventricle. Merely by way of example, the starting slice image may be the basal slice of the left ventricle. The blood pool area of the basal slice of heart may be the largest among all the slice images. The region inside the endocardial boundary of myocardium may also be referred to as a blood pool area.

In some embodiments, the endocardial boundary of the myocardium and the reference image may be determined by analyzing the blood pool area in one or more candidate images in the starting slice image. More descriptions regarding the determinations of the boundary of myocardium and the reference image in starting slice image may be found elsewhere in the present disclosure (e.g., FIG. 4 and the relevant descriptions).

In 320, an endocardial boundary of myocardium and a reference image in non-starting slice image may be determined. In some embodiments, the determinations of the endocardial boundary of myocardium and the reference image may be performed by processor 140. The endocardial boundary of myocardium and reference image in the $M^{th}$ slice images may be determined according to the reference image and the region of interest of the $(M-1)^{th}$ slice images. M may be any integer greater than 1 and less than or equal to N (i.e., the number of slice images). More descriptions regarding the determinations of endocardial boundary of myocardium and reference image in non-starting slice image may be found elsewhere in the present disclosure (e.g., FIG. 5 and the relevant descriptions).

Figure 4:
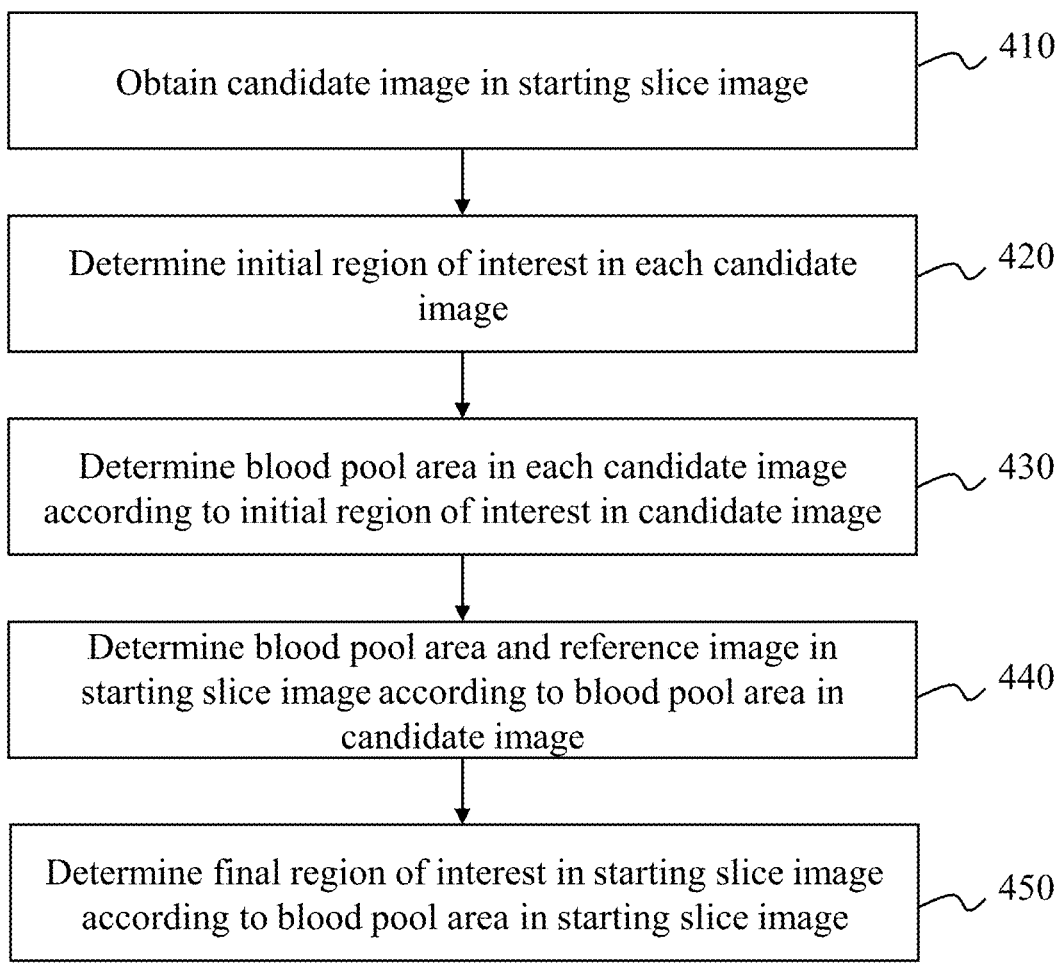
FIG. 4 illustrates a flowchart illustrating an exemplary process for determining the endocardial boundary of myocardium and the reference image of starting slice image in accordance with some embodiments of the present disclosure.

In some embedment's, step 310 of process 300 may be performed according to an exemplary process 400 illustrated in FIG. 4 for determining the endocardial boundary of the myocardium and the reference image of starting slice image in accordance with some embodiments of the present disclosure.

In 410, one or more candidate images in the starting slice image may be obtained. In some embodiments, the one or more candidate images may be obtained by processor 140. The number of candidate images obtained may be any integer smaller than T (i.e., the number of cardiac cycle). In some embodiments, the one or more candidate images in the starting slice image may be one or more MR images obtained from T/4 to 2T/3 with an interval of two cardiac cycles.

Figure 10A:
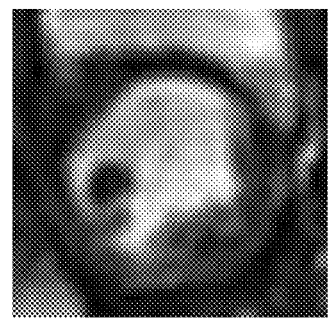
FIG. 10a illustrates an exemplary preliminary region of interest in the candidate image of the starting slice image in accordance with some embodiments of the present disclosure.

In 420, an initial region of interest in each candidate image may be determined. In some embodiments, the determination of the initial region of interest may be performed by processor 140. The initial region of interest in a candidate image may be a central area in the candidate image. The initial region of interest in a candidate image may be in any shape. In some embodiments, the initial region of interest in a candidate image may be a square whose side length is 111 pixels. In some embodiments, the initial region of interest in a candidate image may be a square as shown in FIG. 10a.

Figure 10B:
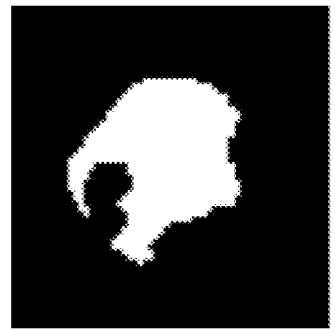
FIG. 10b illustrates an exemplary blood pool area in the candidate image of the starting slice image in accordance with some embodiments of the present disclosure.

In 430, a blood pool area in each candidate image may be determined according to the initial region of interest in the candidate image. In some embodiments, the determination of the blood pool area may be performed by processor 140. The initial region of interest in a candidate image may be determined using a fuzzy c-means clustering algorithm. The blood pool area may be the area with greatest roundness in the binary image of the clustered candidate image. The blood pool area may also be referred to as the region inside the endocardial boundary of myocardium in the candidate image. The roundness may be determined according to Equation (1) below:

$$\text{Roundness} = \frac{P*P}{4*\pi*S}, \quad (1)$$

wherein P refers to the perimeter of an area in the binary clustered candidate image and S refers to the size of an area in the binary clustered candidate image. In some embodiments, the clustering number may be two. As shown in FIG. 10b, the white area depicts a blood pool area in a candidate image. The blood pool area is the region inside the endocardial boundary of myocardium in the candidate image.

In 440, a blood pool area and a reference image in the starting slice image may be determined according to the blood pool areas in one or more candidate images. In some embodiments, the determinations of the blood pool area and reference image may be performed by processor 140. The blood pool area in the starting slice image may be the blood pool area with the lowest centroid in the MR image(s), the greatest average grey value and the greatest roundness in all blood pool areas in one or more candidate images. The reference image may be the candidate image who has the blood pool area with the lowest centroid in the MR image(s), the greatest average grey value and the greatest roundness in all blood pool areas in one or more candidate images.

In 450, a final region of interest in the starting slice image may be determined according to the blood pool area in the starting slice image. In some embodiments, the determination of the final region of interest may be performed by processor 140. The final region of interest in the starting slice image may also be referred to as the region inside the endocardial boundary of myocardium in the starting slice image. The final region of interest in the starting slice image may be determined according to a smoothed convex hull of the blood pool area in the starting slice image. The position of the final region of interest may be determined by the center point of the smoothed convex hull of the blood pool area in the starting slice image. The side length of the final region of interest may be determined by the long axis of the smoothed convex hull of the blood pool area in the starting slice image.

Figure 5:
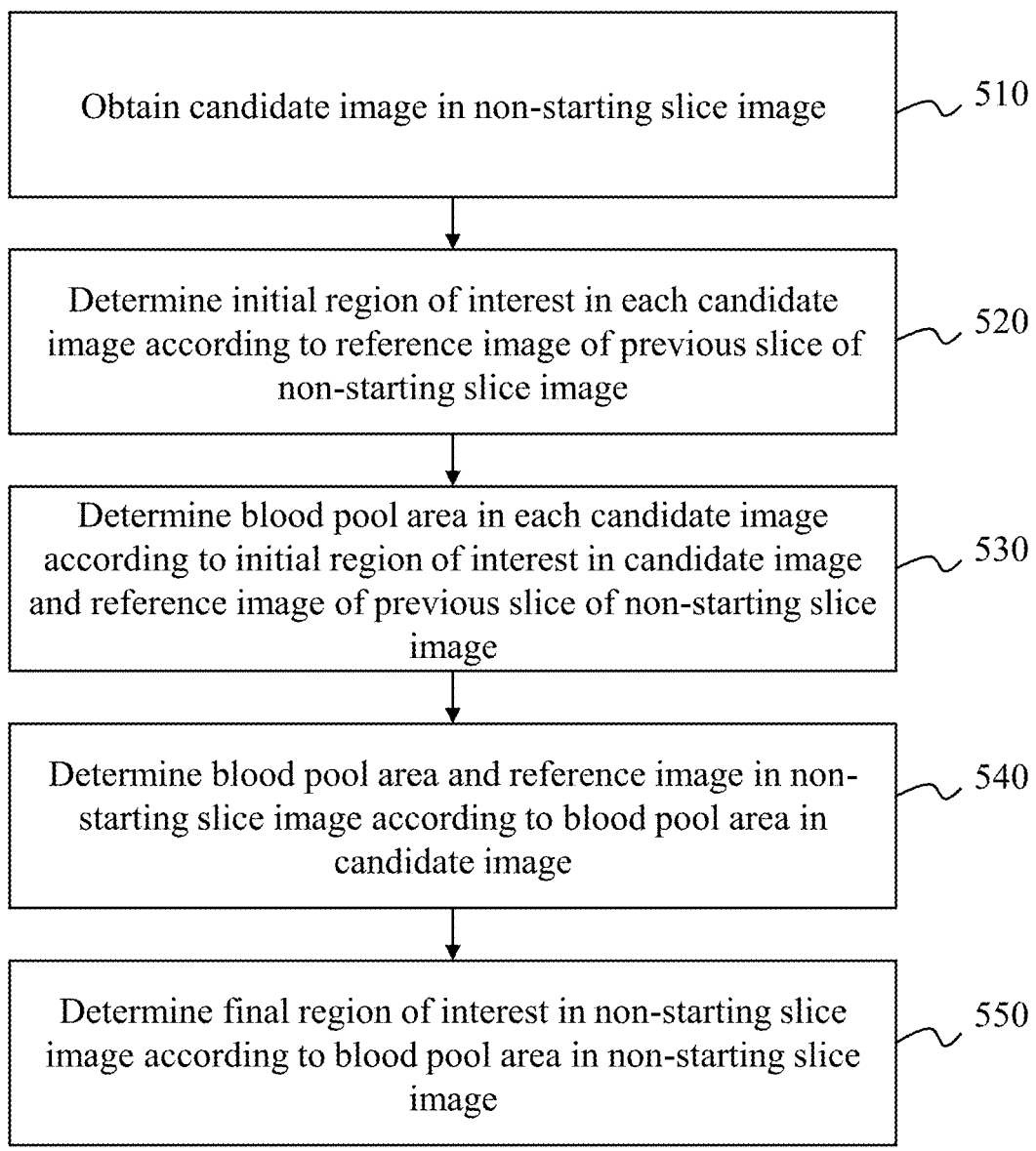
FIG. 5 illustrates a flowchart illustrating an exemplary process for determining the endocardial boundary of myocardium of non-starting slice image in accordance with some embodiments of the present disclosure.

In some embodiments, step 320 of process 300 may be performed according to an exemplary process 500 illustrated in FIG. 5 for determining the endocardial boundary of myocardium of the non-starting slice image, in accordance with some embodiments of the present disclosure.

In 510, one or more candidate images in a non-starting slice image may be obtained. In some embodiments, the one or more candidate images may be obtained by processor 140. The non-starting slice image may be the $M^{th}$ slice images. M may be any positive integer smaller than N (i.e., the number of slice images). The number of candidate images may be any integer smaller than T (i.e., the number of cardiac cycles). Suppose that reference image of the $(M-1)^{th}$ slice images is an MR image obtained in the $R^{th}$ cardiac cycle, the one or more candidate images in the $M^{th}$ slice images may be one or more MR images obtained from T/4 to (R+3) cardiac cycle with an interval of two cardiac cycles.

In 520, an initial region of interest in each candidate image may be determined according to the reference image of the previous slice images of the non-starting slice image. In some embodiments, the determination of the initial region of interest may be performed by processor 140. The previous slice image of the $M^{th}$ slice image may be the $(M-1)^{th}$ slice image. The initial region of interest may be a region determined according to the blood pool area in the reference image of the $(M-1)^{th}$ slice image. Merely by of example, the initial region of interest may be a region that has the same center point with the blood pool area in the reference image of the $(M-1)^{th}$ slice image and whose side length equals to the long axis of blood pool area in the reference image of the $(M-1)^{th}$ slice image plus one or more pixels. In some embodiments, the side length of initial region of interest may be equal to the long axis of blood pool in the reference image of the $(M-1)^{th}$ slice image plus a plurality of pixels. In some embodiments, the range of the number of the pixels may be five to twenty.

In 530, a blood pool area in a candidate image may be determined according to the initial region of interest in the candidate image and the reference image of previous slice image of non-starting slice image. In some embodiments, the determination of the blood pool area in each candidate image may be performed by processor 140. The initial region of interest in a candidate image may be determined using a fuzzy c-means clustering algorithm. In some embodiments, the blood pool area may be an area in the binary clustered candidate image that has the greatest overlap with the blood pool area in the reference image of the $(M-1)^{th}$ slice image and whose long axis is less than 1.1 times the length of the long axis of the blood pool area in the reference image of the $(M-1)^{th}$ slice image. If no area in the binary clustered candidate image meets the conditions, the initial region of interest in the candidate image may be determined again with the clustering number being increased by 1.

In 540, a blood pool area and a reference image in the non-starting slice image may be determined according to the blood pool areas in the one or more candidate images. In some embodiments, the determinations of the blood pool area and the reference image may be performed by processor 140. The blood pool area in the $M^{th}$ slice image may be the blood pool area with lowest centroid in the MR image(s), greatest average grey value and greatest roundness in all blood pool areas in the one or more candidate images. The reference image may be the candidate image who has the blood pool area with lowest centroid in the MR image(s), greatest average grey value and greatest roundness in all blood pool areas in the one or more candidate images.

In 550, a final region of interest in the non-starting slice image may be determined according to blood pool area in the non-starting slice image. In some embodiments, the determination of the final region of interest may be performed by processor 140. The final region of interest in the $M^{th}$ slice image may be determined according to a smoothed convex hull of the blood pool area in the $M^{th}$ slice image. The position of the final region of interest may be determined by the center point of the smoothed convex hull of the blood pool area in the $M^{th}$ slice image. The side length of the final region of interest may be determined by the long axis of the smoothed convex hull of the blood pool area in the $M^{th}$ slice image. Merely by way of example, the final region of interest may have the same center point with the smoothed convex hull of the blood pool area in the $M^{th}$ slice image. The side length of the final region of interest may be a sum of the long axis of the smoothed convex hull of the blood pool area and a double of the thickness of myocardium. In some embodiments, the thickness of myocardium may be equal to or greater than 6 mm and equal to or less than 20 mm.

Figure 6:
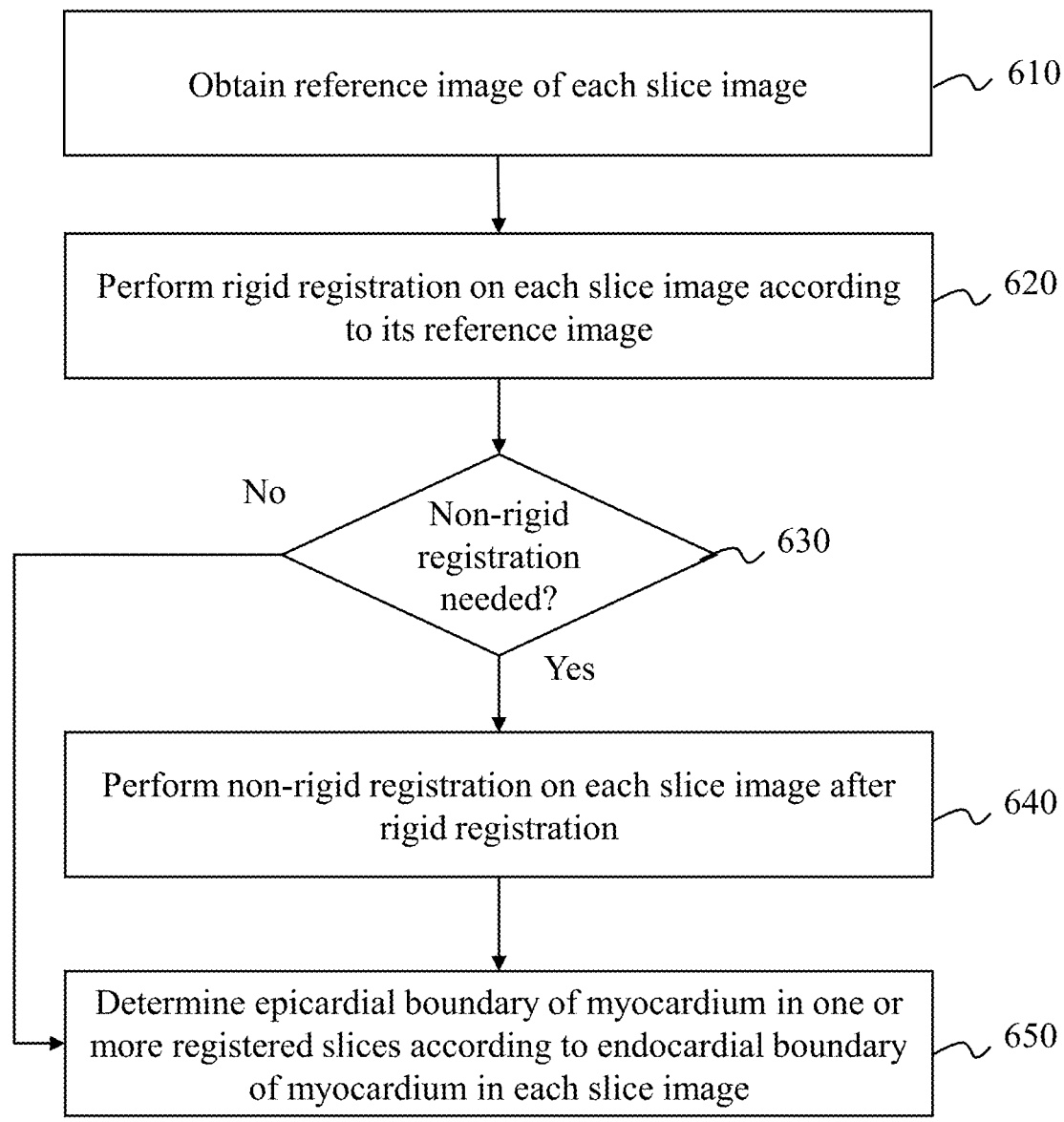
FIG. 6 illustrates a flowchart illustrating an exemplary process for registering slice in accordance with some embodiments of the present disclosure.

In some embodiments, step 230 of process 200 may be performed according to an exemplary process 600 illustrated in FIG. 6 for registering slice image in accordance with some embodiments of the present disclosure.

In 610, a reference image of each slice image may be obtained. In some embodiments, the reference image may be obtained by processor 140. The reference image of the $M^{th}$ slice image may be denoted as $I_{MR}$, wherein M refers to an ordinal number of slice image and R refers to an ordinal number of cardiac cycle of the reference image. M may be any positive integer less than or equal to N (i.e., the number of slice image). R may be any positive integer less than or equal to T (i.e., the number of cardiac cycles). More descriptions regarding the reference image may be found elsewhere in the present disclosure (e.g., FIGS. 3-5 and the relevant descriptions).

In 620, a rigid registration for each slice image may be performed according to the corresponding reference image. In some embodiments, the rigid registration may be performed by processor 140. In some embodiments, the rigid registration of the $M^{th}$ slice image may be performed from the reference image $I_{MR}$ to MR image(s) obtained earlier than the $R^{th}$ cardiac cycle in descending order and to MR image(s) obtained later than $R^{th}$ cardiac cycle in ascending order. The MR image $I_{Mt}$ in the $M^{th}$ slice image obtained in the $t^{th}$ cardiac cycle may be deformed to generate a deformed MR image $I_{Mt'}$. In some embodiments, if t is greater than R, the sum of similarity between the deformed MR image $I_{Mt'}$ and the reference image $I_{MR}$ and similarity between the deformed MR image $I_{Mt'}$ and the registered image MR image $I_{M(t-1)'}$ may reach the maximum. If t may be smaller than R, the sum of similarity between the deformed MR image $I_{Mt'}$ and the reference image $I_{MR}$ and similarity between the deformed MR image $I_{Mt'}$ and the registered image of MR image $I_{M(t+1)'}$ may reach the maximum. The similarity of images may be determined according to amplitude information and angular information of Sobel gradient, and optimization method may be the downhill simplex method.

In some embodiments, the rigid registration of MR image $I_{Mt}$ in the $M^{th}$ slice image obtained in the $t^{th}$ cardiac cycle may include a first step of image registration and/or a second step of image registration. The first step of image registration may include image translation and/or image scaling. The second step of image registration may include image translation, image scaling, and/or image rotation. In some embodiments, the first step of image registration may include translate and/or scale an MR image among the range of 1 pixel to 13 pixels. The second step of image registration may include translate, scale, and/or rotate an MR image among the range of 1 pixel to 3 pixels.

In 630, a judgment may be made as to whether a non-rigid registration of slice image after the rigid registration is needed. In some embodiments, the judgement may be made by processor 140. The similarity between MR image $I_{Mt'}$ after rigid registration and the reference image of the $M^{th}$ slice image $I_{Mr}$ may be denoted as S_ref. The similarity between the MR image $I_{Mt'}$ after rigid registration and the MR image $I_{M(t-1)'}$ after rigid registration or the similarity between MR image $I_{Mt'}$ after rigid registration and MR image $I_{M(t+1)'}$ after rigid registration may be denoted as S_pre. If the average value of first-order derivatives of S_ref and S_pre is greater than 0.03, there is a need to perform non-rigid registration on the MR image $I_{Mt'}$ after rigid registration and step 640 may be performed. Otherwise, there is no need to perform non-rigid registration on the MR image $I_{Mt'}$ after rigid registration and step 650 may be performed.

In 640, a non-rigid registration may be performed on each slice image after rigid registration. In some embodiments, the non-rigid registration may be performed by processor 140. The non-rigid registration of the $M^{th}$ slice image after rigid registration may be performed from the reference image $I_{MR}$ to MR image(s) obtained earlier than the $R^{th}$ cardiac cycle in descending order and to MR image(s) obtained later than the $R^{th}$ cardiac cycle in ascending order. The non-rigid registration may be performed according to Demons non-rigid registration algorithm. The non-rigid registration of a MR image after rigid registration may be performed by registering the MR image to match its pseudo ground-truth image.

The pseudo ground-truth image of the MR image $I_{Mt}$ in $M^{th}$ slice image obtained in the $t^{th}$ cardiac cycle may be denoted as $P_{Mt}$. If t equal to (R−1) or (R+1) in which R refers to the ordinal number of cardiac cycle of the reference image $I_{MR}$ in the $M^{th}$ slice, the pseudo ground-truth image $P_{Mt}$ may be the reference image $I_{MR}$. If t is greater than R, the pseudo ground-truth image $P_{Mt}$ may be the weighted average of $0.3*I_{M(t-1)'}$ and $0.7*P_{M(t-1)}$. If t is smaller than R, the pseudo ground-truth image $P_{Mt}$ may be the weighted average of $0.3*I_{M(t+1)'}$ and $0.7*P_{M(t+1)}$.

In 650, the epicardial boundary of myocardium in each slice image may be determined according to the endocardial boundary of myocardium in registered each slice image. In some embodiments, the determination of the epicardial boundary of myocardium may be performed by processor 140. More descriptions regarding the determination of the epicardial boundary of myocardium may be found elsewhere in the present disclosure (e.g., FIGS. 7-8 and the relevant descriptions).

Figure 7:
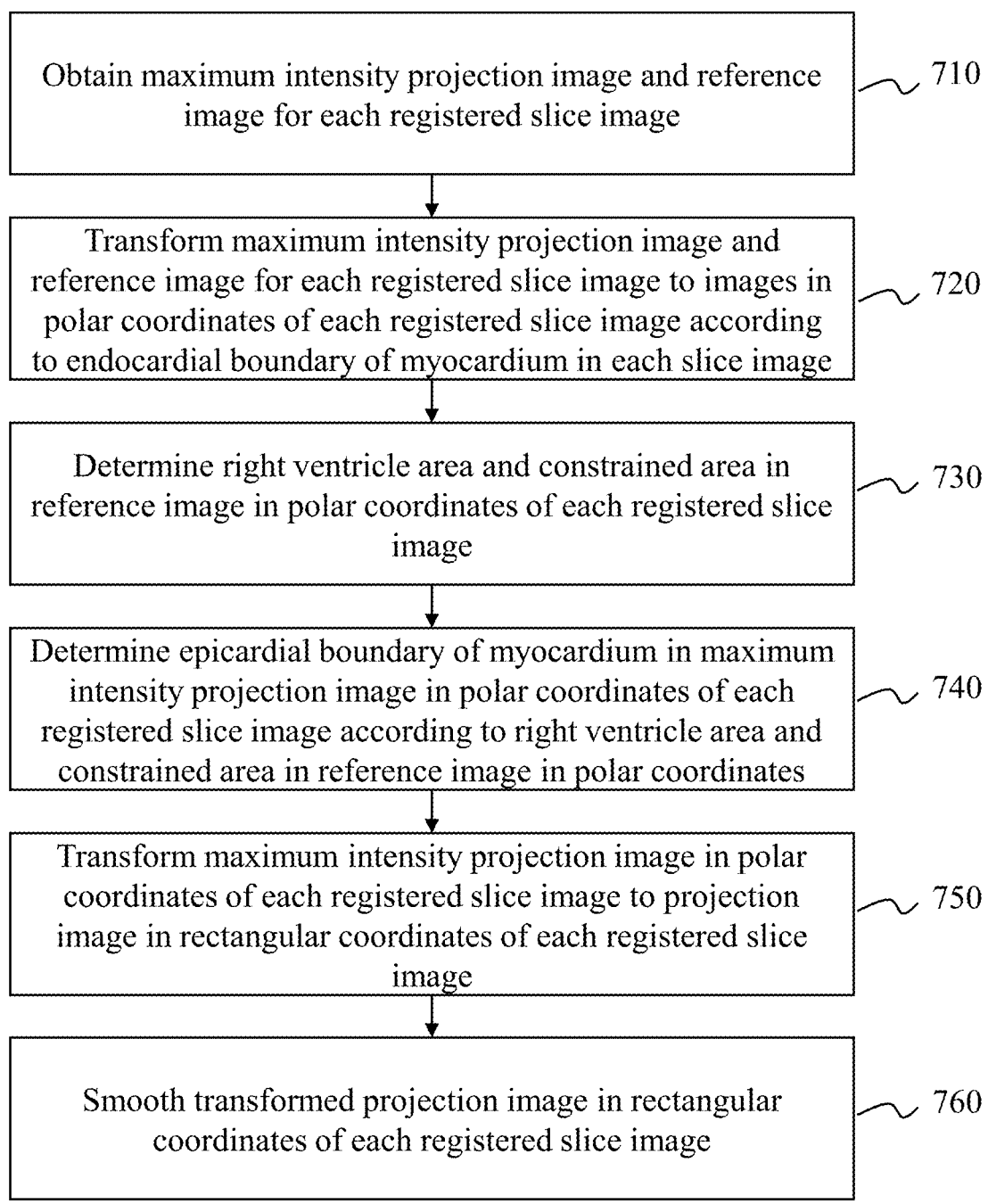
FIG. 7 illustrates a flowchart illustrating an exemplary process for determining the epicardial boundary of myocardium in accordance with some embodiments of the present disclosure.

In some embodiments, step 240 of process 200 may be performed according to an exemplary process 700 illustrated in FIG. 7 for determining the epicardial boundary of myocardium, in accordance with some embodiments of the present disclosure.

Figure 12A:
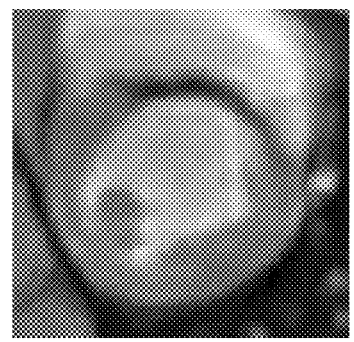
FIG. 12a illustrates an exemplary maximum intensity projection image in accordance with some embodiments of the present disclosure.

In 710, a maximum intensity projection (MIP) image and a reference image for each slice image may be obtained. In some embodiments, the MIP image and the reference image may be obtained by processor 140. The maximum intensity projection image of each slice image may be generated based on maximum intensity projection method. The MIP image of the $M^{th}$ slice may be denoted as $I_{MIP(M)}$. FIG. 12a illustrates an exemplary maximum intensity projection image in accordance with some embodiments of the present disclosure.

Figure 12B:
FIG. 12b illustrates an exemplary maximum intensity projection image in the polar coordinates in accordance with some embodiments of the present disclosure.

In 720, the maximum intensity projection image $I_{MIP(M)}$ and the reference image $I_{MR}$ for each slice image may be transformed to the maximum intensity projection image $P_{MIP(M)}$ and the reference image $P_{MR}$ of each slice image in the polar coordinates. In some embodiments, the transformation of image(s) may be performed by processor 140. The transformation of the maximum intensity projection image and the reference image may be performed with the transforming center at the centroid of blood pool area in each slice image. As shown in FIG. 12b, the maximum intensity projection image is transformed to a maximum intensity projection image in the polar coordinates.

In 730, a right ventricle area and a constrained area in reference image in the polar coordinates of each slice image may be determined. In some embodiments, the determination of the right ventricle area and constrained area may be performed by processor 140. More descriptions regarding the determination of constrained area may be found elsewhere in the present disclosure (e.g., FIG. 8 and the relevant descriptions).

In 740, the epicardial boundary of myocardium may be determined in MIP image in the polar coordinates of each slice image according to the right ventricle area and the constrained area in reference image in the polar coordinates. In some embodiments, the determination of the epicardial boundary of myocardium may be performed by processor 140. The optimal path of epicardial boundary of myocardium may be determined according to dynamic-programming method and ray-tracing method. The dynamic-programming method may be a method for solving a problem by breaking it down into a collection of problems at different stages and solving each of those problems. The ray generated by the ray tracing method (i.e., each column in the two dimensional MIP image in the polar coordinates) may be the stage. The point in the ray (i.e., a point in each column in the two-dimensional MIP image in the polar coordinates) may be the candidate point in each stage.

The path of epicardial boundary of myocardium may be determined according to the candidate point in each stage. The optimal path of epicardial boundary of myocardium may be the path which has the minimum local cost. The local cost of stage may be determined by a first kind of energy and a second kind of energy. The first kind of energy may be determined according to smoothness of a path. The second kind of energy may be determined according to the gradient of the path. In some embodiments, the first kind of energy may be determined according to the distance between two adjacent candidate points, and the second kind of energy may be determined according to the gradient of maximum intensity projection image $P_{MIP(M)}$ in the column direction. The gradient direction of the column of right ventricle area may be opposite to the gradient direction of other columns. The gradient of pixels in constrained area may be infinite, that is, the second kind of energy of pixels in constrained area may be infinite.

In 750, the maximum intensity projection image in the polar coordinates of each slice image may be transformed to a projection image in the Cartesian coordinates of each slice image. In some embodiments, the transformation of image(s) may be performed by processor 140. As shown FIG. 12c, the grey curve depicts an epicardial boundary of myocardium.

In 760, the transformed projection image in the Cartesian coordinates of each slice image may be smoothed. In some embodiments, the smoothing of image(s) may be performed by processor 140.

It should be noted that process 700 described above is provided for the purposes of illustration, and not intended to limit the scope of the present disclosure. Apparently for persons having ordinary skills in the art, numerous variations and modifications may be conducted under the teaching of the present disclosure. However, those variations and modifications do not depart the protection scope of the present disclosure. In some embodiments, one or more steps may be optional. For example, step 760 may be omitted. Similar modifications should fall within the scope of the present disclosure.

Figure 8:
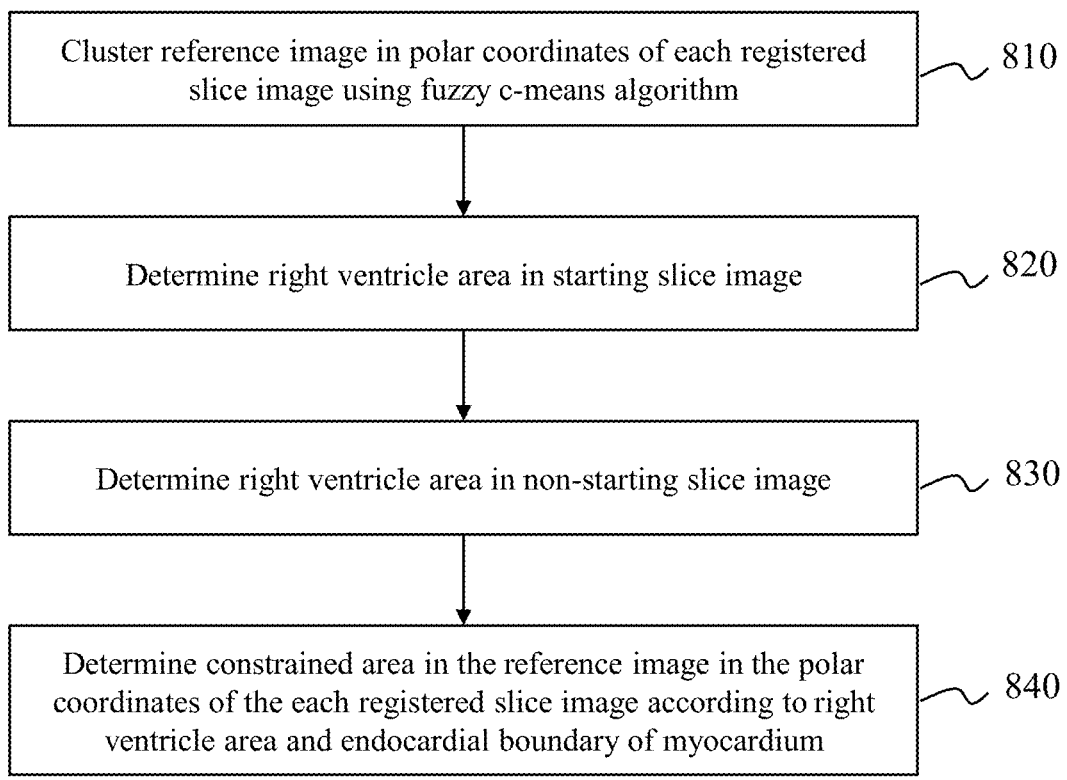
FIG. 8 illustrates a flowchart illustrating an exemplary process for determining the right ventricle area and the constrained area in accordance with some embodiments of the present disclosure.

In some embodiments, step 730 of process 700 may be performed according to an exemplary process 800 illustrated in FIG. 8 for determining right ventricle area and constrained area in accordance with some embodiments of the present disclosure.

In 810, a reference image in the polar coordinates of each slice image may be clustered using fuzzy c-means algorithm. In some embodiments, the clustering of the image may be performed by processor 140. The clustering number of the reference image in the polar coordinates may be the same as the clustering number of candidate images in determining blood pool area (see, for example, the descriptions relating to step 430 in FIG. 4 provided elsewhere in this disclosure).

In 820, a right ventricle area in a starting slice image may be determined. The right ventricle area in the starting slice image may be the largest area except the blood pool area in the brightest cluster.

In 830, a right ventricle area in a non-starting slice image may be determined. In some embodiments, the determination of the right ventricle area may be performed by processor 140. The right ventricle area in the $M^{th}$ slice image may be the area with the greatest overlap with the right ventricle area of the $(M-1)^{th}$ slice in the brightest cluster.

In 840, a constrained area in the reference image in the polar coordinates of the each slice image may be determined according to the right ventricle area and endocardial boundary of myocardium in each slice image. In some embodiments, the determination of the constrained area may be performed by processor 140. The constrained area may include a first area and a second area and a third area. The first area may be an enlarged area of the blood pool area. For example, the first area may be an enlarged area consisting of the blood pool area and three pixels around the endocardial boundary of myocardium. The second area may be an area expect the blood pool area and the right ventricle in the brightest cluster. The third area may be an area consisted of the pixels below the regions except the blood pool region and the right ventricle region in the brightest cluster.

FIG. 9 illustrates an exemplary MR image in accordance with some embodiments of the present disclosure. The MR image may be include N slices obtained in T cardiac cycles. The MR image may include N*T MR images in total.

FIG. 10a illustrates an exemplary initial region of interest in candidate image of the starting slice image in accordance with some embodiments of the present disclosure. As shown in FIG. 10a, the initial region of interest in a candidate image of the starting slice image is a square.

FIG. 10b illustrates an exemplary blood pool area in candidate image of the starting slice image in accordance with some embodiments of the present disclosure. As shown in FIG. 10b, the white area depicts a blood pool area in the candidate image of the starting slice image.

Figure 10C:
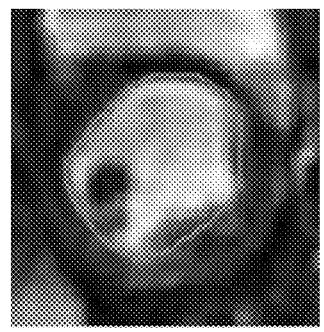
FIG. 10c illustrates an exemplary endocardial boundary of myocardium in the starting slice image in accordance with some embodiments of the present disclosure.

FIG. 10c illustrates an exemplary endocardial boundary of myocardium in the starting slice image in accordance with some embodiments of the present disclosure. As shown in FIG. 10c, the grey roughly round curve depicts the endocardial boundary of myocardium blood pool area in the starting slice image.

Figure 11A:
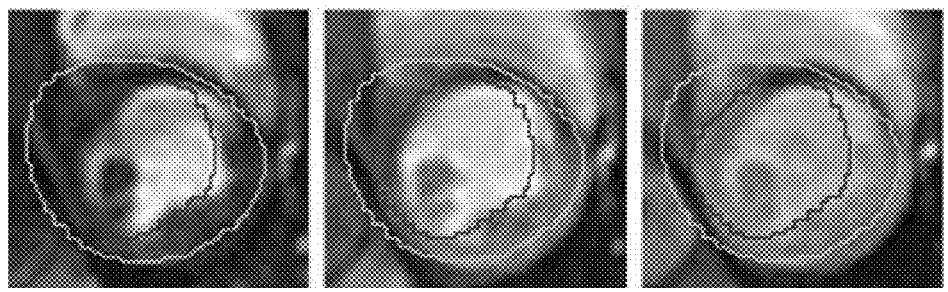
FIG. 11a illustrates exemplary MR images before the image registration in accordance with some embodiments of the present disclosure.
Figure 11B:
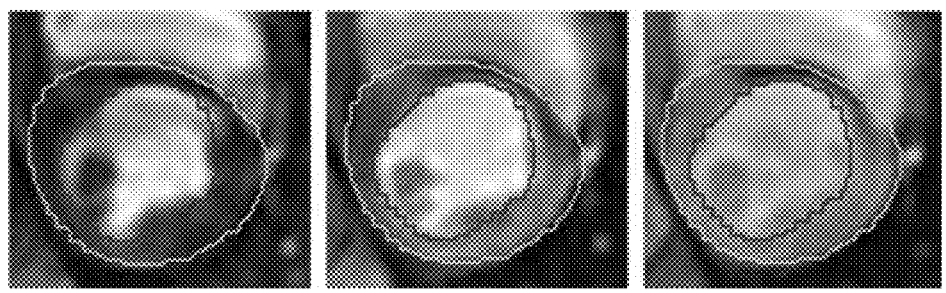
FIG. 11b illustrates exemplary MR images after the image registration in accordance with some embodiments of the present disclosure.

FIG. 11a illustrates exemplary MR images before the image registration in accordance with some embodiments of the present disclosure. FIG. 11b illustrates exemplary MR images after the image registration in accordance with some embodiments of the present disclosure. The dark roughly round curve depicts the endocardial boundary of myocardium. The undertint roughly round curve depicts the epicardial boundary of myocardium.

Figure 12C:
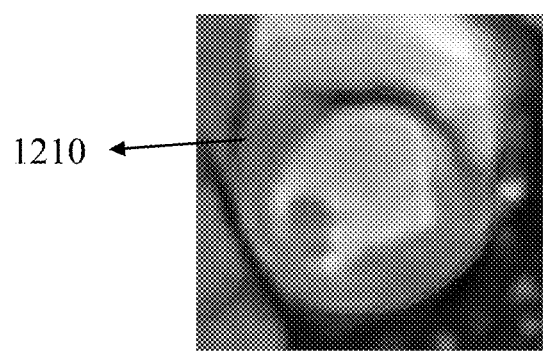
FIG. 12c illustrates an exemplary epicardial boundary of myocardium in accordance with some embodiments of the present disclosure.

FIG. 12a illustrates an exemplary maximum intensity projection image of an MR image in accordance with some embodiments of the present disclosure. FIG. 12b illustrates an exemplary maximum intensity projection image in the polar coordinates in accordance with some embodiments of the present disclosure. FIG. 12c illustrates an exemplary epicardial boundary of myocardium in accordance with some embodiments of the present disclosure. The grey roughly round curve depicts an epicardial boundary of myocardium.

FIG. 13 illustrates an exemplary partitioned myocardium in accordance with some embodiments of the present disclosure. As shown in FIG. 13, the largest roughly circular curve depicts the epicardial boundary of myocardium. The dark roughly circular curve depicts the endocardial boundary of myocardium. The area between the largest roughly circular curve and the dark roughly circular curve is the myocardium of the left ventricle. The internal region within the myocardium is the blood pool of the left ventricle. The white roughly circular curve on the myocardium partitions the myocardium into two parts. The black straight lines partitions the myocardium into six segments.

Figure 14:
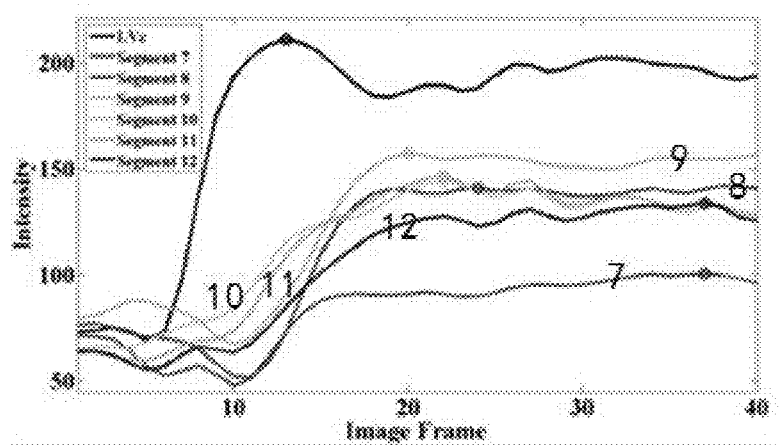
FIG. 14 illustrates exemplary time-intensity curves in accordance with some embodiments of the present disclosure.

FIG. 14 illustrates exemplary time-intensity curves in accordance with some embodiments of the present disclosure. The X-axis is time and the Y-axis is grey value. As shown in FIG. 14, there are six y time-intensity curves of six segments of myocardium.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the operator's computer, partly on the operator's computer, as a stand-alone software package, partly on the operator's computer and partly on a remote computer or entirely on the remote computer or server. In the latter scenario, the remote computer may be connected to the operator's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A method comprising:
    obtaining an MR image including a plurality of slice images, the plurality of slice images including a myocardium of a left ventricle, each of the plurality of slice images including one or more images obtained in one or more cardiac cycles, the plurality of slice images including a starting slice image and one or more non-starting slice images;
    for each slice image of the plurality of slice images, determining a reference image and an endocardial boundary of the myocardium;
    registering the each slice image of the plurality of slice images according to the corresponding reference image; and
    determining an epicardial boundary of the myocardium in the each registered slice image of the plurality of registered slice images according to the endocardial boundary of the myocardium in the each slice image of the plurality of slice images, wherein:
        for at least one non-starting slice image of the one or more non-starting slice images, the determining a reference image and an endocardial boundary of the myocardium is based at least in part on a reference image of a previous slice image of the at least one non-starting slice image.

2. The method of claim 1, wherein for the each slice image of the plurality of slice images, the determining a reference image and an endocardial boundary of the myocardium includes:
    determining the endocardial boundary of the myocardium and the reference image in the starting slice image; and
    for each non-starting slice image, determining the endocardial boundary of the myocardium and the reference image in the non-starting slice image based at least in part on a reference image of a previous slice image of the non-starting slice image.

3. The method of claim 2, wherein determining the endocardial boundary of the myocardium and the reference image in the starting slice image further includes:
    obtaining one or more candidate images in the starting slice image;
    determining an initial region of interest in the one or more candidate images;
    determining a blood pool area in the one or more candidate images according to the initial region of interest in the one or more candidate images;
    determining a blood pool area in the starting slice image and the reference image in the starting slice image according to the blood pool areas in the one or more candidate images; and
    determining a final region of interest in the starting slice image according to the blood pool area in the starting slice image.

4. The method of claim 2, wherein determining the endocardial boundary of the myocardium and the reference image in a non-starting slice image further includes:
    obtaining one or more candidate images in the non-starting slice image;
    determining an initial region of interest in the one or more candidate images according to the reference image of the previous slice of the non-starting slice image;
    determining a blood pool area in the one or more candidate images according to the initial region of interest in the one or more candidate images and the reference image of the previous slice of the non-starting slice image;
    determining a blood pool area in the non-starting slice image and the reference image in the non-starting slice image according to the blood pool area in the one or more candidate images; and determining a final region of interest in the non-starting slice image according to the blood pool area in the non-starting slice image.

5. The method of claim 1, wherein registering the each slice image of the plurality of slice images according to the corresponding reference image further includes:
performing a rigid registration on the each slice image of the plurality of slice images according to the corresponding reference image;
determining whether a non-rigid registration of the each slice image of the plurality of slice images after rigid registration is needed; and
performing a non-rigid registration on the each slice image of the plurality of slice images after the rigid registration if a non-rigid registration of the each slice image of the plurality of slice images after rigid registration is needed.

6. The method of claim 5, wherein performing the rigid registration on the each slice image of the plurality of slice images further includes a first step of image registration and a second step of image registration.

7. The method of claim 5, wherein:
the rigid registration of the each slice image of the plurality of slice images is performed from the reference image of the each slice image of the plurality of slice images
to an image obtained in an earlier cardiac cycle than the reference image and
to an image obtained in a later cardiac cycle than the reference image, and the rigid registration of the each slice image of the plurality of slice images includes:
deforming the each slice image of the plurality of slice images,
determining a first similarity between the deformed each slice image of the plurality of slice images and the reference image of the each slice image of the plurality of slice images,
determining a second similarity, the second similarity being determined
between the deformed each slice image and a registered image of a previous slice image, or
between the deformed each slice image and a registered image of a next slice image, and
determining whether a sum of the first similarity and the second similarity is largest.

8. The method of claim 1, wherein determining the epicardial boundary of the myocardium in the each registered slice image of the plurality of registered slice images according to the endocardial boundary of the myocardium in the each slice image of the plurality of slice images further includes:
obtaining a maximum intensity projection image and the reference image of the each registered slice image of the plurality of registered slice images,
transforming the maximum intensity projection image and the reference image of the each registered slice image of the plurality of registered slice images to a maximum intensity projection image and a reference image in polar coordinates of the each registered slice image of the plurality of registered slice images according to the endocardial boundary of the myocardium in the each slice image of the plurality of slice images;
determining a right ventricle area and a constrained area in the reference image in the polar coordinates of the each registered slice image of the plurality of registered slice images; and determining the epicardial boundary of the myocardium in the maximum intensity projection image in the polar coordinates of the each registered slice image of the plurality of registered slice images according to the right ventricle area and the constrained area in the reference image in the polar coordinates of the each registered slice image of the plurality of registered slice images.

9. The method of claim 8, wherein determining the right ventricle area and the constrained area in the reference image in the polar coordinates of the each registered slice image of the plurality of registered slice images further includes:
clustering the reference image in the polar coordinates of the each registered slice image of the plurality of registered slice images;
determining the right ventricle area in the reference image in the polar coordinates in a starting slice image;
determining the right ventricle area in the reference image in the polar coordinates in a non-starting slice image;
determining the constrained area according to the right ventricle area and the endocardial boundary of the myocardium in the reference image in the polar coordinates of the each registered slice image of the plurality of registered slice images.

10. The method of claim 1 further comprising:
partitioning the myocardium of the left ventricle in the each slice image of the plurality of slice images.

11. The method of claim 10, wherein partitioning the myocardium of the left ventricle in the each slice image of plurality of slice images is according to a Bull's eye method.

12. A device for image processing, the device comprising:
a storage device configured to store instructions; and
one or more processors configured to execute the instructions to perform a method comprising:
obtaining an MR image including a plurality of slice images, the plurality of slice images including a myocardium of a left ventricle, each of the plurality of slice images including one or more images obtained in one or more cardiac cycles, the plurality of slice images including a starting slice image and one or more non-starting slice images;
for each slice image of the plurality of slice images, determining a reference image and an endocardial boundary of the myocardium;
registering the each slice image of the plurality of slice images according to the corresponding reference image; and
determining an epicardial boundary of the myocardium in the each registered slice image of the plurality of registered slice images according to the endocardial boundary of the myocardium in the each slice image of the plurality of slice images, wherein:
for at least one non-starting slice image of the one or more non-starting slice images, the determining a reference image and an endocardial boundary of the myocardium is based at least in part on a reference image of a previous slice image of the at least one non-starting slice image.

13. The device of claim 12, wherein for the each slice image of the plurality of slice images, the determining a reference image an endocardial boundary of the myocardium includes:
determining the endocardial boundary of the myocardium and the reference image in the starting slice image;
for each non-starting slice image, determining the endocardial boundary of the myocardium and the reference image in the non-starting slice image based at least in part on a reference image of a previous slice image of the non-starting slice image; and determining the reference image in the non-starting slice image.

14. The device of claim 13, wherein determining the endocardial boundary of the myocardium and the reference image in the starting slice image further includes:

obtaining one or more candidate images in the starting slice image;

determining an initial region of interest in the one or more candidate images;

determining a blood pool area in the one or more candidate images according to the initial region of interest in the one or more candidate images;

determining a blood pool area in the starting slice image and the reference image in the starting slice image according to the blood pool areas in the one or more candidate images; and determining a final region of interest in the starting slice image according to the blood pool area in the starting slice image.

15. The device of claim 13, wherein determining the endocardial boundary of the myocardium and the reference image in the non-starting slice image further includes:

obtaining one or more candidate images in the non-starting slice image;

determining an initial region of interest in the one or more candidate images according to the reference image of the previous slice of the non-starting slice image;

determining a blood pool area in the one or more candidate images according to the initial region of interest in the one or more candidate images and the reference image of the previous slice of the non-starting slice image;

determining a blood pool area in the non-starting slice image and the reference image in the non-starting slice image according to the blood pool area in the one or more candidate images;

determining a final region of interest in the non-starting slice image according to the blood pool area in the non-starting slice image.

16. The device of claim 12, wherein registering the each slice image of the plurality of slice images according to the corresponding reference image further includes:

performing a rigid registration on the each slice image of the plurality of slice images according to the corresponding reference image;

determining whether a non-rigid registration of the each slice image of the plurality of slice images after rigid registration is needed; and performing a non-rigid registration on the each slice image of the plurality of slice images after the rigid registration if a non-rigid registration of the each slice image of the plurality of slice images after rigid registration is needed.

17. The device of claim 16, wherein performing the rigid registration on the each slice image of the plurality of slice images further includes a first step of image registration and a second step of image registration.

18. The device of claim 12, wherein determining the epicardial boundary of the myocardium in the each registered slice image of the plurality of registered slice images according to the endocardial boundary of the myocardium in the each slice image of the plurality of slice images further includes:

obtaining a maximum intensity projection image and the reference image of the each registered slice image of the plurality of registered slice images, transforming the maximum intensity projection image and the reference image of the each registered slice image of the plurality of registered slice images to a maximum intensity projection image and a reference image in polar coordinates of the each registered slice image of the plurality of registered slice images according to the endocardial boundary of the myocardium in the each slice image of the plurality of slice images;

determining a right ventricle area and a constrained area in the reference image in the polar coordinates of the each registered slice image of the plurality of registered slice images; and determining the epicardial boundary of the myocardium in the maximum intensity projection image in the polar coordinates of the each registered slice image of the plurality of registered slice images according to the right ventricle area and the constrained area in the reference image in the polar coordinates of the each registered slice image of the plurality of registered slice images.

19. The method of claim 18, wherein determining the right ventricle area and the constrained area in the reference image in the polar coordinates of the each registered slice image of the plurality of registered slice images further includes:

clustering the reference image in the polar coordinates of the each registered slice image of the plurality of slice images;

determining the right ventricle area in the reference image in the polar coordinates in a starting slice image;

determining the right ventricle area in the reference image in the polar coordinates in a non-starting slice image;

determining the constrained area according to the right ventricle area and the endocardial boundary of the myocardium in the reference image in the polar coordinates of the each registered slice image of the plurality of registered slice images.

20. A non-transitory computer readable medium, comprising a set of instructions, wherein when executed by at least one processor, the set of instructions direct the at least one processor to effectuate a method, the method comprising:

obtaining an MR image including a plurality of slice images, the plurality of slice images including a myocardium of a left ventricle, each of the plurality of slice images including one or more images obtained in one or more cardiac cycles, the plurality of slice images including a starting slice image and one or more non-starting slice images;

for each slice image of the plurality of slice images, determining a reference image and an endocardial boundary of the myocardium;

registering the each slice image of the plurality of slice images according to the corresponding reference image; and determining an epicardial boundary of the myocardium in the each slice registered image of the plurality of registered slice images according to the endocardial boundary of the myocardium in the each slice image of the plurality of slice images, wherein:

for at least one non-starting slice image of the one or more non-starting slice images, the determining a reference image and an endocardial boundary of the myocardium is based at least in part on a reference image of a previous slice image of the at least one non-starting slice image.

\* \* \* \* \*